United States Patent [19]

Weinberg

[11] Patent Number: 5,138,311
[45] Date of Patent: Aug. 11, 1992

[54] COMMUNICATION SYSTEM HAVING ADAPTABLE MESSAGE INFORMATION FORMATS

[75] Inventor: Morton Weinberg, Lantana, Fla.
[73] Assignee: Motorola, Inc., Schaumburg, Ill.
[21] Appl. No.: 585,845
[22] Filed: Sep. 20, 1990
[51] Int. Cl.⁵ .............................................. H04B 7/00
[52] U.S. Cl. ............................. 340/825.03; 340/825.44
[58] Field of Search ................... 379/56, 57, 111, 112, 379/121, 134; 340/825.03, 825.44, 825.47, 825.48; 455/31, 32, 38, 115

[56] References Cited

U.S. PATENT DOCUMENTS

| | | | |
|---|---|---|---|
| 4,882,744 | 11/1989 | Hashimoto | 340/825.44 |
| 4,926,460 | 5/1990 | Gutman et al. | 379/57 |
| 4,942,598 | 7/1990 | Davis | 379/57 |

FOREIGN PATENT DOCUMENTS 0181338  7/1989  Japan ................................ 340/825.44

Primary Examiner—Donald J. Yusko
Assistant Examiner—Dervis Magistre
Attorney, Agent, or Firm—Jose Gutman; Daniel R. Collopy; William E. Koch

[57] ABSTRACT

A communication system includes an input (202) for requesting and receiving a first message information format and for requesting and receiving a second message information format, and controller (210) for detecting a measure of communication activity and for comparing the measure of communication activity to a threshold that is adaptable by the controller (210) as a function of the communication activity. The communication system accepts the first message information format when the measure of communication activity is below the threshold (604, 610, 606, and 608), and accepts the second message information format when the measure of communication activity is above the threshold (604, 610, 612, 614, and 616).

44 Claims, 11 Drawing Sheets

COMMUNICATION SYSTEM HAVING ADAPTABLE MESSAGE INFORMATION FORMATS

FIELD OF THE INVENTION

This invention relates in general to the field of communication systems capable of receiving message information in a plurality of formats and also capable of measuring communication activity, and more specifically to those communication systems capable of detecting a measure of communication activity and comparing the measure of communication activity to a threshold for controlling the communication activity.

BACKGROUND OF THE INVENTION

A communication system (e.g., a paging system 100), such as illustrated in FIG. 1, commonly accepts a page request from several different sources (e.g. a telephone 102, a page entry terminal device 104, and a computer with modem 106). The page request is normally accepted through a public or private telephone network 108, which couples the page request from one of the source (i.e. callers) to an automatic telephone input (110A, 110B, or 110C) at a paging terminal 112. Optionally, a dedicated input 114 at the paging terminal 112 can accept a page request from a local video display terminal (VDT) or console. The dedicated input 114 is usually associated with a telephone switchboard and message dispatch service that accepts the page request from a telephone caller and enters the page request into the paging terminal 112 typically via the video display terminal.

After accepting the page request, the paging terminal 112 encodes and transmits, via a conventional transmitter 116, a page to a selective call receiver (e.g., a pager). Conventional paging systems may convey information from a caller to a pager user via a plurality of message formats. FIG. 1 illustrates a number of conventional selective call receivers that may convey information to the pager user via either an alphanumeric display message page 118, a numeric display message page 120, a voice message page 121, or a tone only page 122. In the latter case, the tone only page 122 (i.e., no message page), alerts (e.g., an audible beep), the user that a caller wants the pager user to respond by calling a prearranged telephone number, such as a receptionist telephone number.

A conventional selective call receiver commonly receives a page alerts the pager wearer, and optionally presents the message information according to a message format that is mapped to a pager address on the paging system. The unique pager address typically represents the message format (e.g., alphanumeric, numeric, voice, or tone only), supported by the selective call receiver. Therefore, by matching the unique pager address with the appropriately formatted message, a page with a specific message format may be effectively transmitted to the selective call receiver by the paging terminal 112.

Modern selective call receivers may be capable of receiving and presenting message information in a plurality of formats, typically using separate pager addresses mapped to the same selective call receiver. For example, one pager address may be mapped to a numeric display message format and a second pager address may be mapped to a voice message format. Therefore, information may be conveyed from a caller to the pager user in either numeric display message format or voice message format.

Hence, the aforementioned communication system 100 is capable of receiving message information in a plurality of formats. The message formats are mapped to unique pager addresses supported by the communication system. Where more than one pager addresss and message formal pairs are mapped to the same selective call receiver, information may be conveyed from a caller to a pager user in a plurality of message formats (e.g., alphanumeric display, numerical display, and voice).

The choice of message format to convey the information to the pager user is typically delegated to the caller, subject to the prearranged message formats that are mapped to the particular selective call receiver in the paging system 100. In the previous example, a caller may convey information to the pager user via either numeric display message format or voice message format. The choice of message format to use is commonly at the discretion of the caller. Typically, a telephone number is available for each valid message format mapped to the selective call receiver in the system 100. Therefore, the caller with knowledge of the two telephone numbers mapped to the exemplary selective call receiver may convey information to the pager user by entering either telephone number into the paging terminal 112 as part of the page request.

Specifically, one message format may have significant advantages over the other message format with respect to overall system performance and throughput; however, the caller is normally not encumbered with such information. The choice of message format may be consequently disadvantageous for meeting the performance demands of the overall system. When the system resources (e.g., paging terminal memory or communication channel capacity), in this example, are consumed to near capacity, the caller continues to have the choice of conveying information in either numeric display or voice message format. A regulation of messge format choices may typically result when the communication system begins rejecting incoming page requests due to lack of available system resources, Therefore, the caller may attempt to convey information in a requested message format and be frustrted with a system rejection of the page request. Subsequently, the caller may attempt again to convey the information in a different message format resulting possibly in another rejection, and so on until an eventual successful communication or the caller simply stops trying. The system resources and throughput are consequently minimally managed by this conventional "supply versus demand" mechanism .

Additionally, such a communication system 100 is also capable of measuring communication activity (i.e., communication traffic), and optionally reporting status. Communication activity may be monitored by a number of ways. For example, a ratio of the amount of time spent transmitting information over the communication channel versus the amount of communication channel idle time may serve to indicate a measure of communication activity. Alternately, a measure of system resources usage (e.g., a ratio of the amount of paging terminal 112 memory used up by current pages in process versus the toatal amount of memory available for storing page information) may be monitored as an indication of communication activity. Typically, the measure of communication activity is presented to a system operator via some form of indicator (e.g., lamps, light emitting diodes (LEDs), or the video display terminal (VDT)).

The conventional paging system 100 approaching throughput capacity typically may reject incoming page requests, thereby simply regulating the communication activity according to the available system resources (i.e., "supply versus demand"). Moreover, the indicated measure of communication activity may alert the system operator to increase system resources (e.g., install more memory into the paging terminal), or to increase the number of communication channels (e.g., add transmitters), and move some of the communication traffic to the new channels. When overall system throughput is constrained, the conventional imperative is to add system resources. Due to the extreme competition in today's marketplace, the consequences of not growing or adapting the system may include limiting the number of messages that may be conveyed, loss of potential revenue, loss of customer satisfaction and ultimately loss of competitiveness leading to business failure. Moreover, in a governmental or medical communication system the loss of communication may prove grave and devastating for a community.

With out increasing dependance on contemporary communication systems, which tend to grow to capacity very quickly, it is imperative that alternate means of adapting and optimally managing a communication system are available to enhance the overall system's throughput, typically measured by the amount of coummunication activity handled by the system.

SUMMARY OF THE INVENTION

In carrying out one form of this invention, there is provided a communication system, comprising means for receiving a first message information format, means for receiving a second message information format, control means for detecting a measure of communication activity and for comparing the measure of communication activity to a threshold that is adaptable by the control means as a function of the communication activity, and means for accepting the first message information format when the measure of communication activity is below the threshold and accepting the second message information format when the measure of coummunication activity is above the threshold.

BRIED DESCRIPTION OF THE DRAWINGS

FIG. 4 A is a timing diagram illustrating a paging system channel utilization in a heavy traffic system.

Figure 4A:
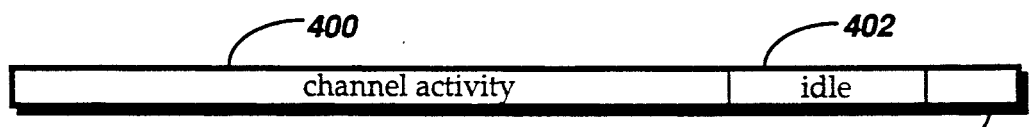
Figure 4B:
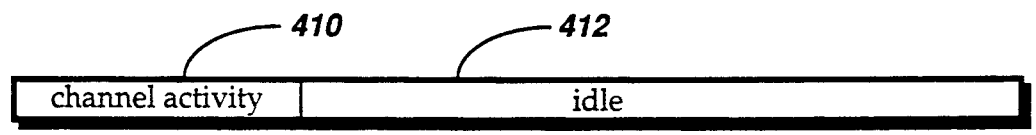

FIG. 4B is a timing diagram illustrating the paging system channel utilization in a light traffic system.

Figure 5:
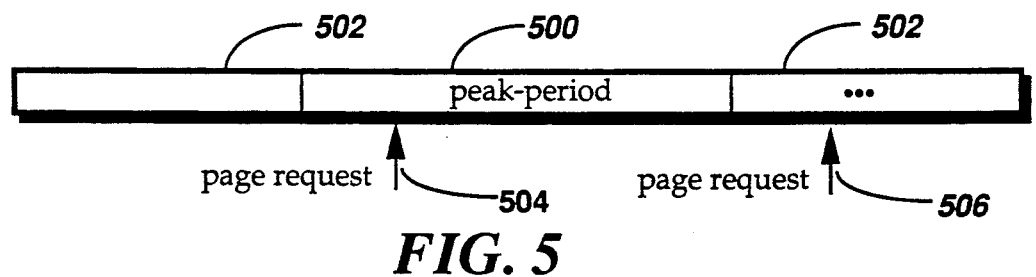

FIG. 5 is a timing diagram showing a page request arriving outside a peak-period time interval and a page request arriving within the peak-period time interval.

Figure 6:
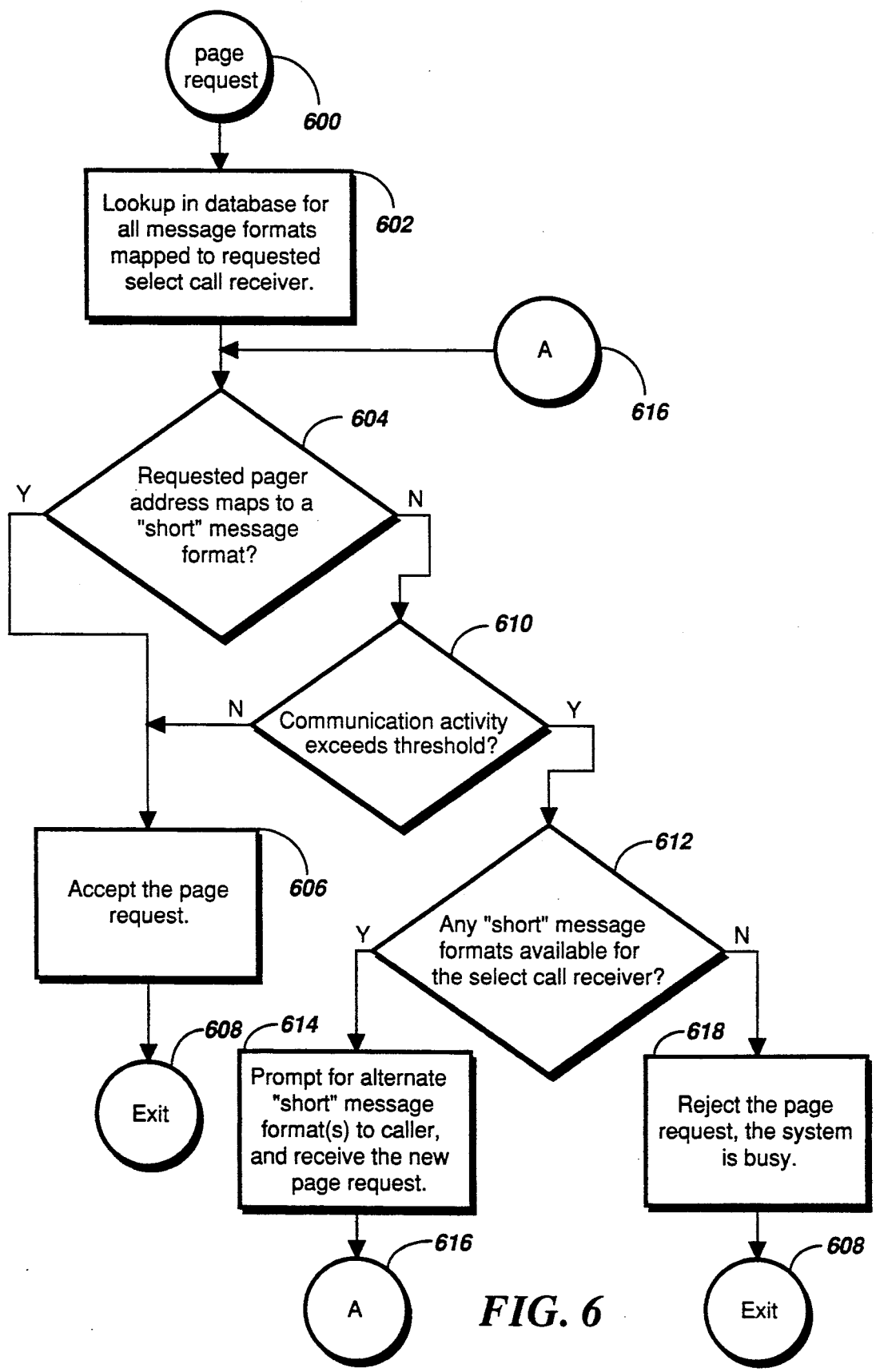

FIG. 6 is a flow chart illustrating a paging terminal control sequence according to an embodiment of the present invention.

Figure 7:
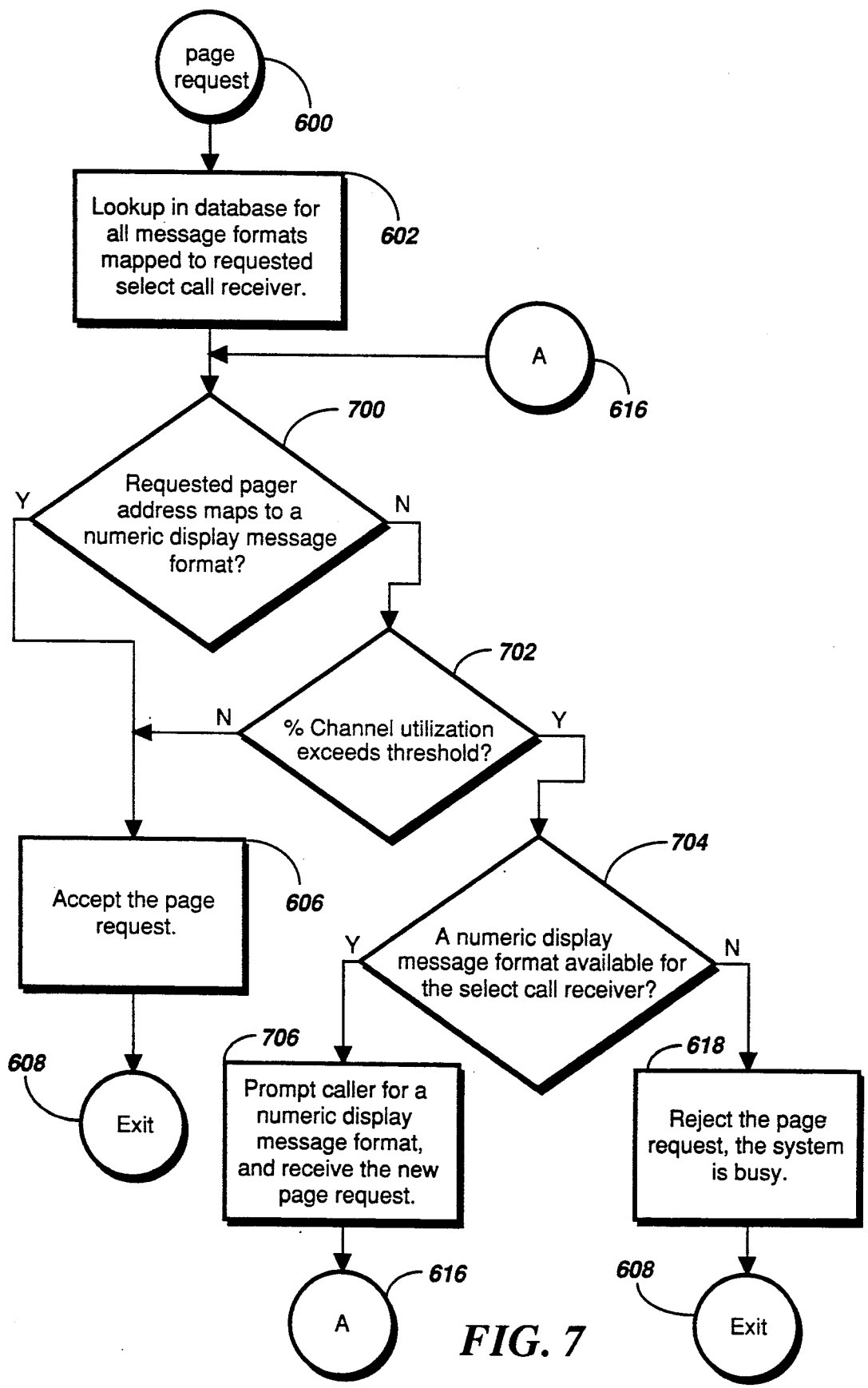

FIG. 7 is a flow chart illustrating a paging terminal control sequence using "% channel utilization " for a measure of communication activity and alternating to a numeric display message format when the measure of communication activity is determined above a threshold percent channel utilization, according to an embodiment of the present invention.

Figure 8:
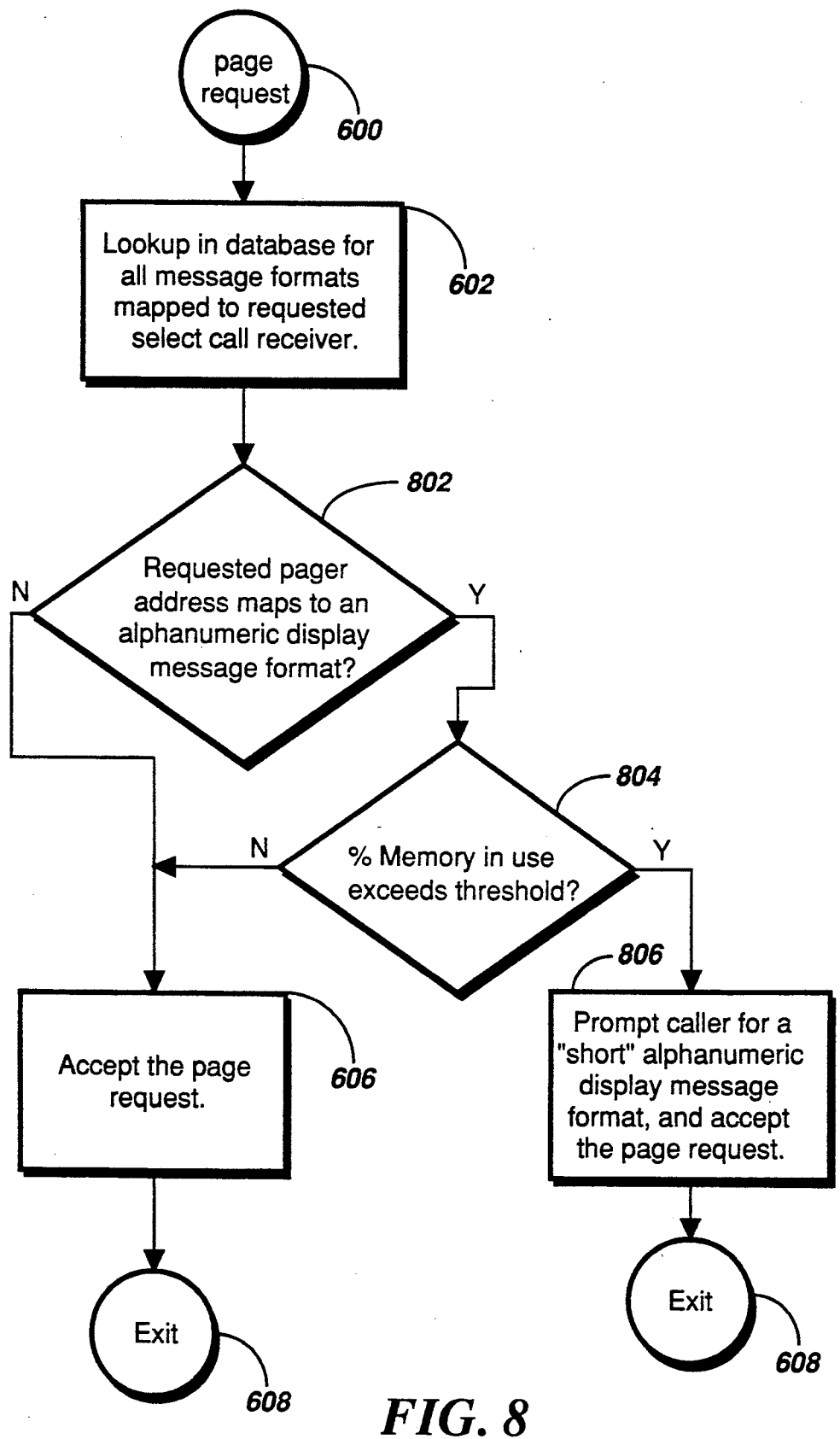

FIG. 8 is a flow chart illustrating a paging terminal control sequence using "% memory in use" for a measuring of communication activity and alternating to a reduced length alphanumeric display message format when the measure of communication activity is determined above a threshold percent memory use, in accordance with an embodiment of the present invention.

Figure 9:
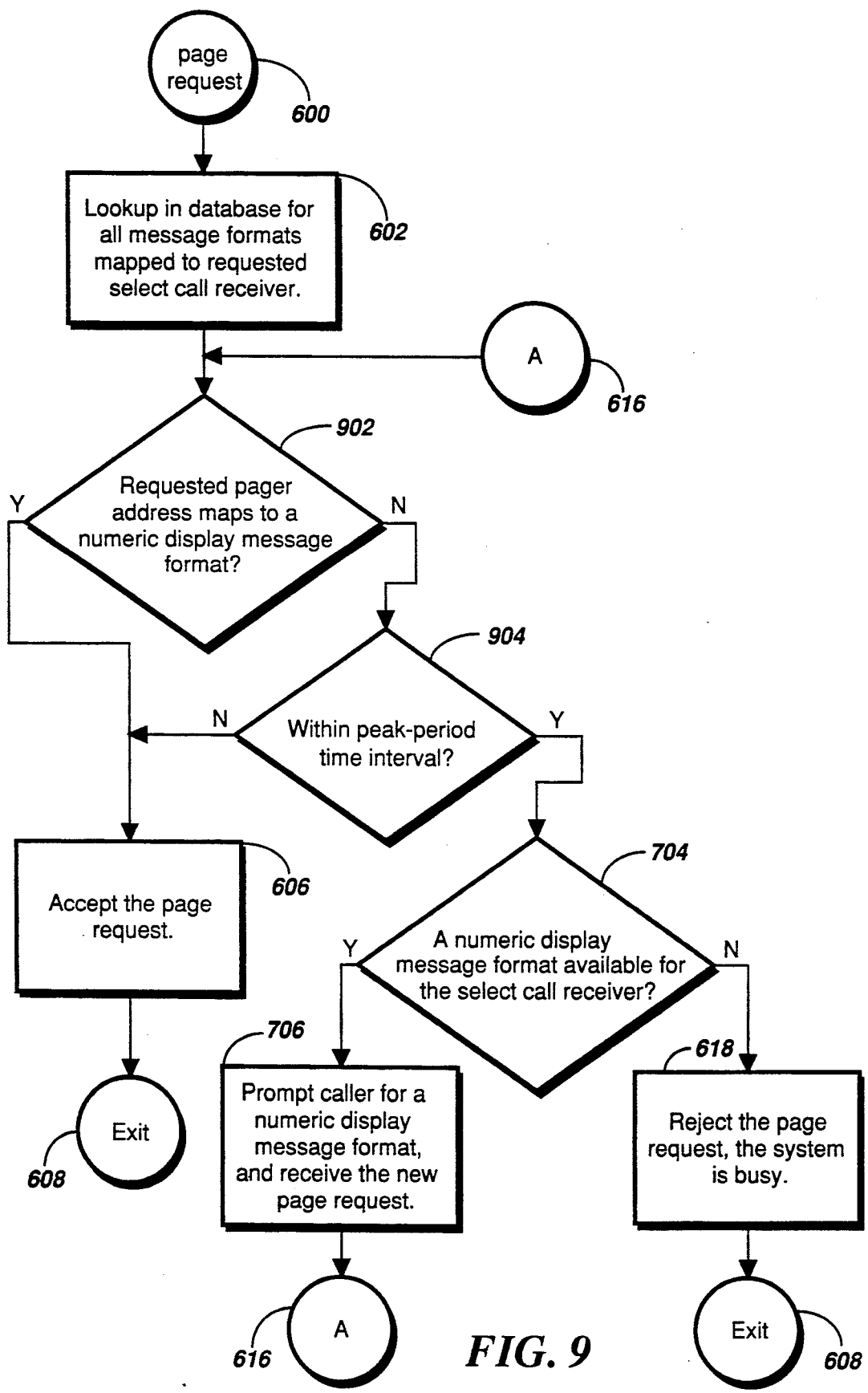

FIG. 9 is a flow chart illustrating a paging terminal control sequence using a "peak-period time interval" detection for a measure of communication activity and alternating to a numeric display message format when the measure of communication activity is determined above a threshold (i.e., within the peak-period), according to an embodiment of the present invention.

Figure 10A:
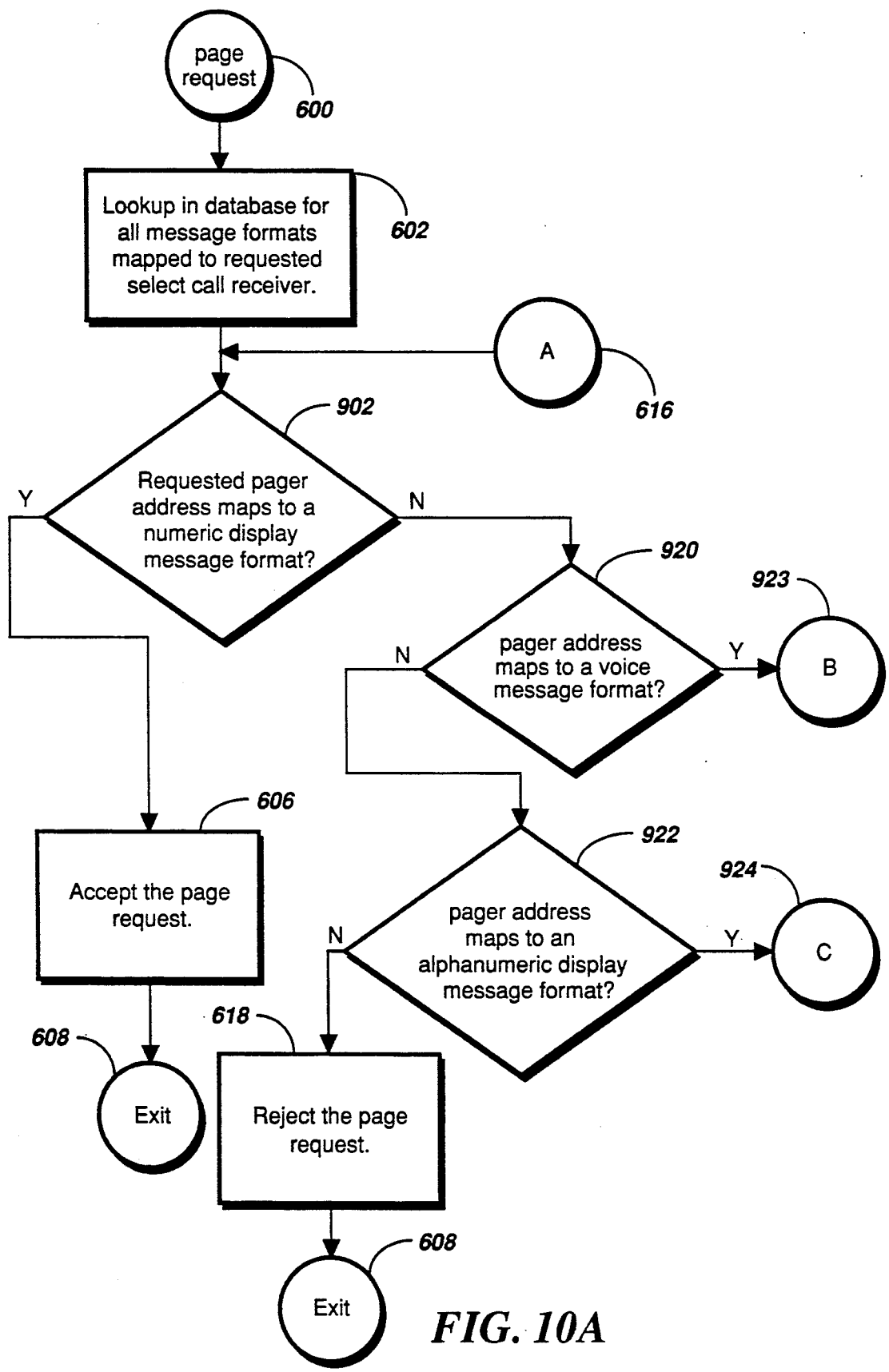
Figure 10B:
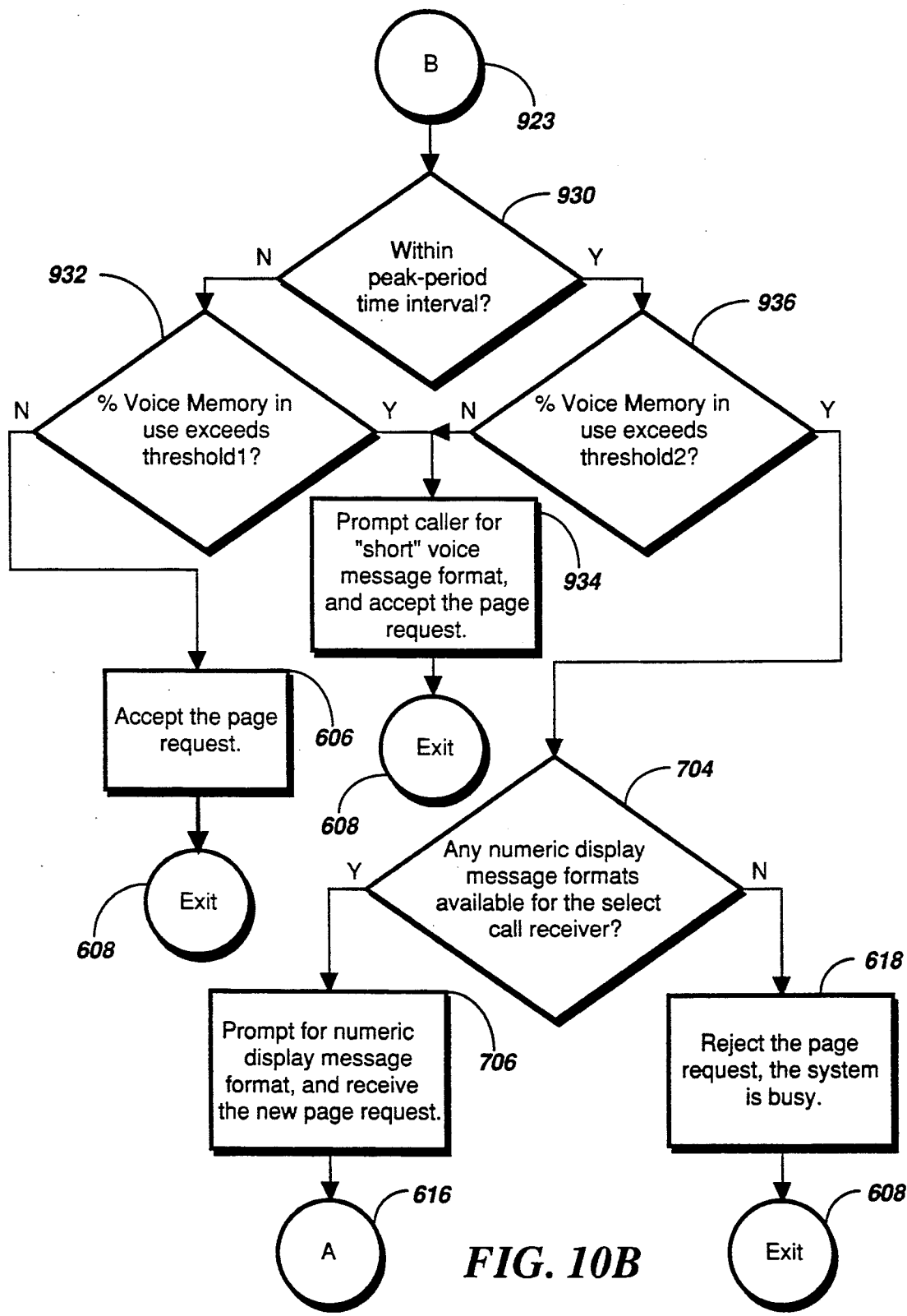
Figure 10C:
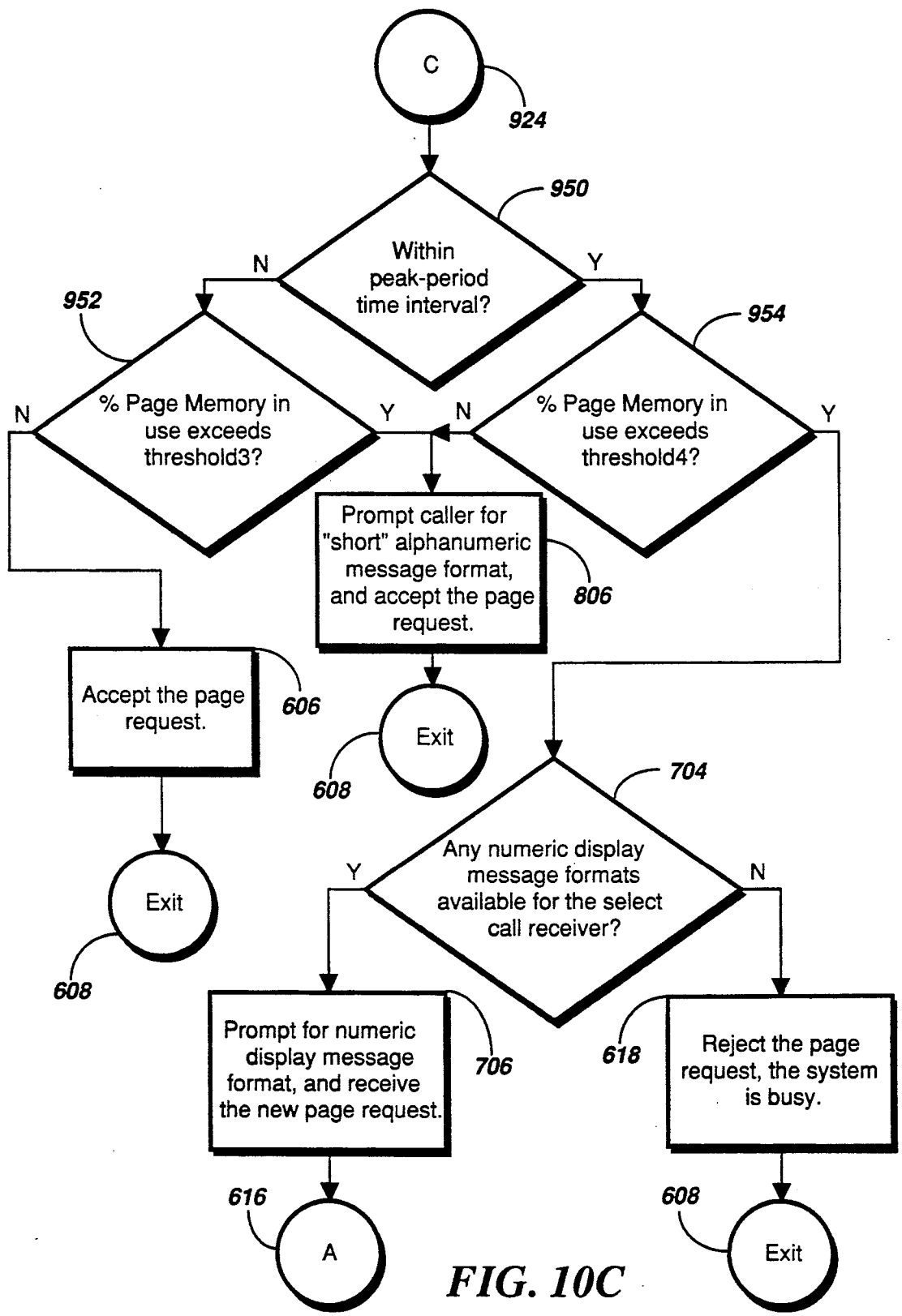

FIGS. 10A, 10B, and 10C comprise a flow chart illustrating a paging terminal control sequence using a more complex "% memory in use" algorithm combined with a "peak-period time interval" detection algorithm for a measure of communication activity and using a threshold that is adaptable by the controller, in accordance with an embodiment of the present invention.

DESCRIPTION OF A PREFERRED EMBODIMENT

Figure 1:
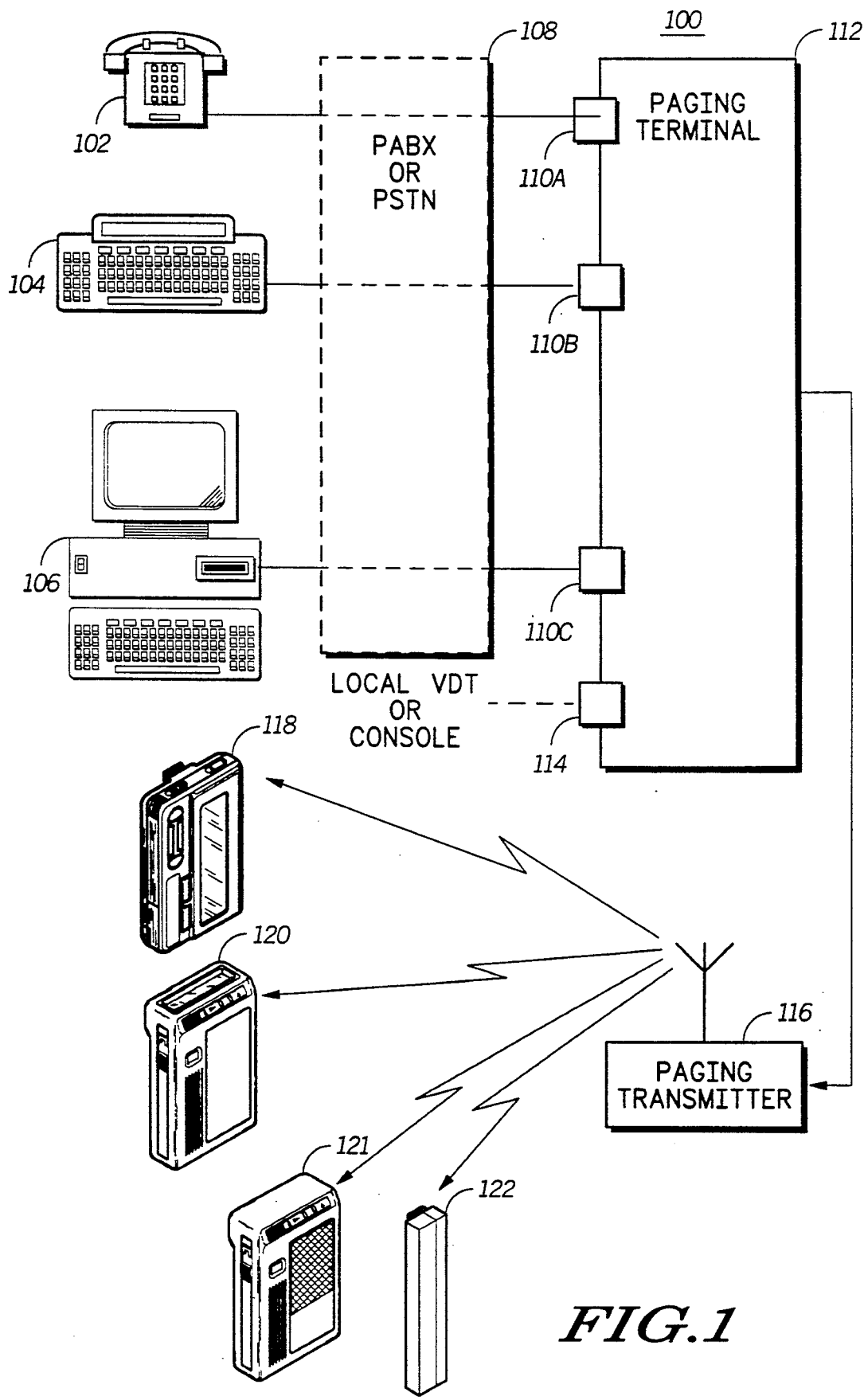
FIG. 1 is a block of a conventional communication system (e.g., a paging system).
Figure 2:
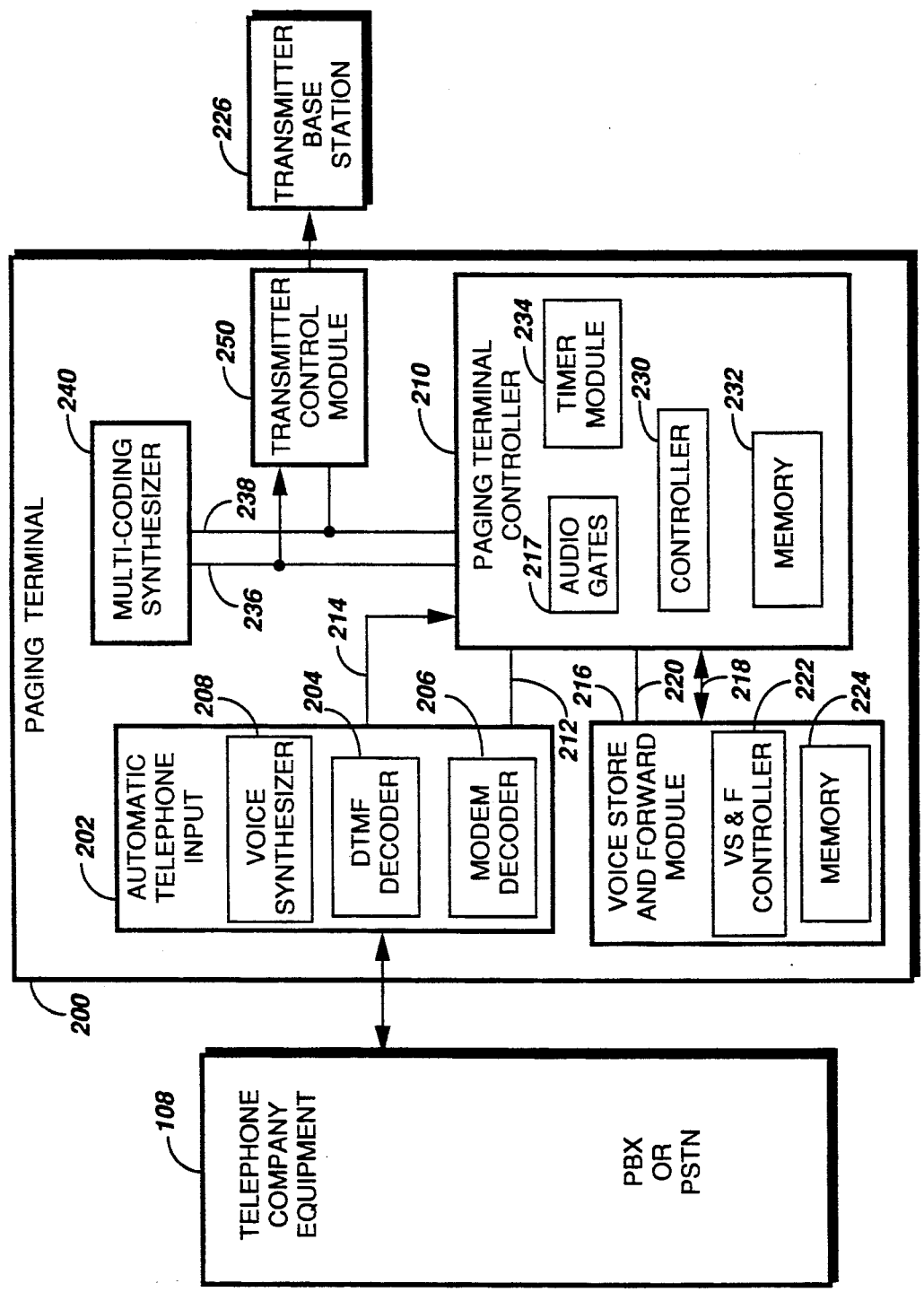
FIG. 2 is a block diagram of a paging terminal in accordance with an embodiment of the present invention.

Referring to FIG. 2, a block diagram of a communication system (i.e., a paging system) comprising a paging terminal 200 is shown in accordance with an embodiment of the present invention. The paging terminal 200 interfaces with telephone company equipment 108 via at least one automatic telephone input 202. A caller may enter a page request into the communication system using conventional DTMF communication 204 or modem communication 206. Optionally, a voice synthesizer 208 may present a synthesized voice at the telephone interface, and thereby prompt the caller through the page request entry process. Alternately, the caller may be conventionally prompted using tones at the telephone interface.

The automatic telephone input 202 communicates the page request information to a paging terminal controller 210 via an input control bus 212 and optionally an input audio bus 214. The input audio bus 214 routes a voice message from the caller into the paging system for systems capable of handling voice message pages. Since a paging channel and its associates transmitter 226 may not always be available to communicate the incoming page request immediately to a selective call receiver (not shown), the paging terminal controller 210 may temporarily transfer the voice message information to an optional voice store and forward (VS&F) module 216 using audio gates 217, a voice store and forward audio bus 217 and a voice store and forward control bus 220. The voice store and forward module 216 comprises a VS&F controller circuit 222 and associated memory 224 for storing the incoming voice messages and subsequently retrieving and playing them back as part of the voice message pages, under control of the paging terminal controller 210. The storing and retrieving process may be preferably done using a known linear predictive coding (LPC) or a continuously variable slope delta modulation (CVSD) algorithm in the voice store and forward module 216. In this way, the paging terminal 200 may optionally use the voice store and forward module 216 to integrate the arrival times of the incoming voice message page requests with the availability of the paging channel, thereby optimally utilizing the channel capacity.

The paging terminal controller 210 may comprise a controller circuit 230 and associated memory 232, such that an incoming page request may be accepted and stored into available memory 232 for subsequent transmission to a selective call receiver (i.e., as designated by a unique pager address and a message information format for the particular select call receiver). When a page request is received from a caller, the paging terminal controller 210 verifies the requested pager address and coupled message informatin format. By comparing the page request information to a local database of valid pager addresses and message information formats, the paging terminal controller 210 is capable of instructing the automatic telephone input 202 for the required prompting to the caller. Additionally, the accepted page request information may be transferred from the automatic telephone input to the paging terminal controller 210 via the input control bus 212, and stored into a designated area of memory 232. The stored page informatin typically comprises a pager address. However, it may include a numeric display message or an alphanumeric display message, formatted to the requirement of the particular page request using known coding schemes (e.g., POCSAG and GOLAY sequential). In the event of a voice message page, as discussed earlier, the voice message may be stored into a designated area of voice store and forward memory 224, with the pager address and required linking information stored into the area of paging terminal controller memory 232, as may be necessary to subsequently construct the voice message page for transmission to a selective call receiver. Therefore, a page request may be received and accepted by the paging terminal 200, stored into a designated area of memory (i.e., either the VS&F memory 224 or the paging terminal controller memory 232), and subsequently transmitted to a selective call receiver subject to the availability of the paging channel.

Enhancing management of these system resources (e.g., page information storage memory, voice message storage memory, and paging channel utilization) may be shown with an inventive control sequence at the exemplary paging terminal controller 210. Accepting page requests using system performance criteria (i.e., comparing measured communication activity to a threshold) at the paging terminal 200 may significantly improve overall system throughout using the existing system resources, as will be more fully discussed below.

A timer module 234 may be used by the paging terminal controller 210 to perform timed functions for the paging system. Many tasks within the paging terminal 200 require predetermined time intervals. For example, in accepting a page request, typically a signal from a caller to terminate the page request entry process may be either a particular information received from the caller or a predetermined inactivity time interval (i.e., a time interval with no communication deteced from the caller). Moreover, a paging terminal 200 may use the timer module 234 in combination with monitoring system resources, such as memory usage and paging channel utilization, to present system performance statistics to a system operator. These measures of communication activity (i.e., indication of overall system performance) may serve to alert the system operator when to increase system resources to meet increased demands for system throughput. Additionally, these indicators may be monitored by the paging terminal 200 and utilized to enhance the managment of the existing system resources, thereby improving overall system throughput with the available resources, as will be subsequently more fully discussed.

Once a display message page (e.g., alphanumeric display message page or numeric display message page) is ready to be sent to a selective call receiver, a multi-coding synthesizer module 240 receives the pager address information and the formatted display messge from the memory module 232 (i.e., typically via an output control bus 238). The display pager address information instructs the multi-coding synthesizer module 240 as to what pager address and type of pager encoding is needed (e.g., POCSAG or GOLAY sequential) to effectively transmit the display message page to the selective call receiver.

The paging terminal controller 210 finally instructs the transmitter control module 250 (i.e., via the output control bus 238), to turn "on" the transmitter basestation 226 and begin transmitting over the paging system channel. The multi-coding synthesizer module 240 is typically responsible for sending the encoded display message page information to the transmitter basestation 226 (i.e., typically via an output audio bus 236 and through the transmitter control module 250), which routes the display message page over the paging system channel.

For a voice message page to be sent to a respective select call receiver, the multi-coding synthesizer module 240 receives the pager address information from the memory module 232 and encodes the information accordingly. The paging terminal controller 210 instructs the transmitter control module 250 to turn "on" the transmitter basestation 226 and begin transmitting over the paging system channel. After the multi-coding synthesizer module 240 sends the encoded pager address information to the transmitter basestation 226, the paging terminal controller 210 instructs the voice store and forward module 216 to "play-back" the corresponding voice message from memory 224. The voice message may route to the output audio bus 236 via the audio gates 217 in the paging terminal controller 210, thereby following the encoded pager address information through the transmitter control module 250, through the transmitter basestation 226 and over the paging system channel.

The aforementioned exemplary message formats (e.g., voice, alphanumeric display, and numeric display) may have varying degrees of effect on the communication system performance (i.e. system resources utilization and paging channel utilization). In the exemplary paging system, a voice message page may require more storage memory (232 and 224) than an alphanumeric display message page. Likewise, the alphanumeric display message page typically may require more storage memory 232 than a numeric display message page. In similar fashion, the amount of time required to communicate a voice message page over the paging system channel may be greater than the amount of time required for an alphanumeric display message page, which is greater than the amount of time required for a numeric display message page. Therefore, by using a maximum acceptable threshold of communication activity that may be based on a function of the aforementioned performance criteria during the receiving and accepting of incoming page requests, the paging terminal 200 may enchance overall paging system throughput with the existing system resources, as will be more fully discussed below.

Figure 3:
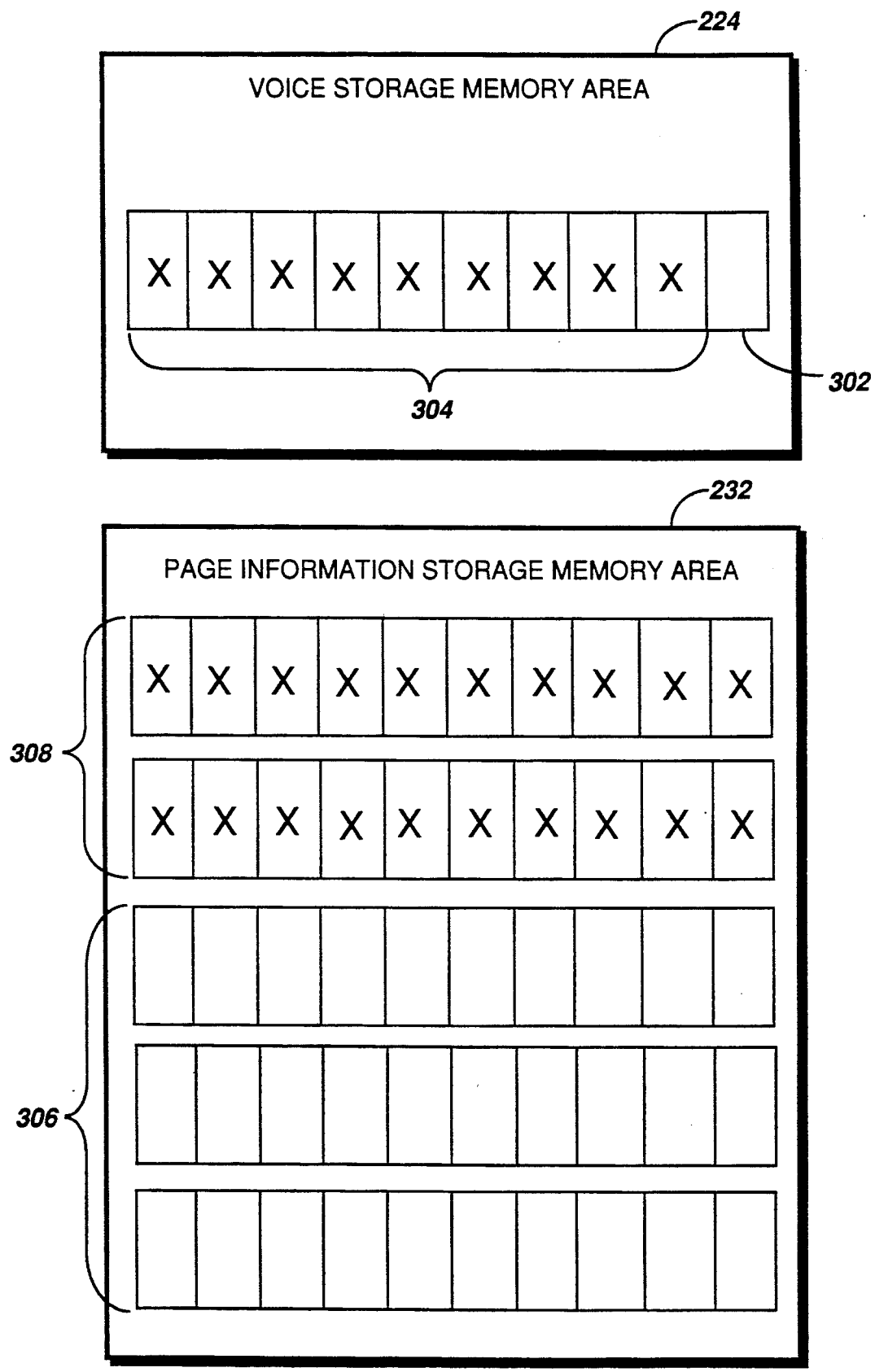
FIG. 3 is a more detailed block diagram of memory components in the paging terminal of FIG. 2.

Referring to FIG. 3, a more detailed representation of the voice storage area in memory 224 and the page information storage area in memory 232 are shown, in accordance with the present invention. The incoming page requests, as discussed earlier, are typically stored into memory (224 and 232), for subsequent transmission to a select call receiver.

In the exemplary paging system, the voice message part of the voice message page request may be stored in a voice storage area of VS&F memory 224, typically organized into memory blocks (302 and 304). Each memory block (302 and 304) may normally store up to a predetermined time duration of the voice message (e.g., four seconds of voice). The memory blocks 304 containing an "X" represent voice message(s) currently stored in memory 224,. The empty memory block 302 is free and available for additional voice message storage. Therefore, in this exemplary paging system, 90% utilization (i.e., nine out of ten memory blocks in use), of the VS&F memory 224 is shown. Consequently, this paging system may be considered to be servicing a high amount of voice message paging traffic for the available system resources.

In similar fashion, the paging terminal controller memory module 232 comprises an area for page information storage, typically organized into memory blocks 306. Each memory block 306 may store enough page information to complete a numeric display message page (i.e., the pager address information coupled with a numeric display message). However, to store long alphanumeric display messages more than one memory block 306 may be required. Therefore, a series of linked memory blocks 306 may be necessary to store the pager address information coupled to a long alphanumeric display message.

The memory blocks 308 containing an "X" represent page information currently stored in memory 232. The empty memory blocks 306 are free and available for additional storage. The stored page information (308) may comprise voice message page information, numeric display message page information, and alphanumeric display message page information. Moreover, the page information (e.g., voice message page, numeric display message page, or alphanumeric display message page) currently stored in the exemplary system memory 232 are normally a consequence of the number and type of incoming page requests that are received and accepted by the paging terminal 200, and that are not immediately transmitted over the paging system channel. Therefore, in this examplary paging system, 40% utilization (i.e., twenty out of fifty memory blocks in use), of the paging terminal controller memory 232 is shown. Consequently, the exemplary paging system may be servicing a moderate to low amount of overall paging traffic, even though it may be servicing a relatively high amount of voice message paging traffic. Hence, one measure of communication activity for the exemplary paging system may be the utilization of memory (224 and 232) in the paging terminal 200.

Therefore, an inventive paging terminal 200 may be able to better manage the memory resources by receiving and accepting those incoming page requests having message formats that optimally fill the available lmemory (224 and 232). In this fashion, more paging traffic could be handled with the existing memory resources (224 and 232), as will be more fully discussed below.

Referring to FIGS. 4A and 4B, two timing diagrams illustrate possible paging channel utilizations for the exemplary paging system. Channel activity 400, in FIG. 4A, may be relatively high as compared to idle time 402 for the paging system channel, indicting a busy paging system. Moreover, channel activity 410 relative to idle time 412, in FIG. 4B, represents a relatively low paging system channel utilization. Hence, the ratio of active (400 and 410) to idle (402 and 412) times for the exemplary paging system may serve to indicate the level of communication activity for the available system resources.

The channel activity (400 and 410) is typically determined by the amount of time that the transmitter basestation 226 is turned "ON". The channel idle time (402 and 412) reflects a lack of communication activity over the paging system channel (i.e., the transmiter basestation 226 is normally turned "OFF"), for the particular time interval. Therefore, the paging terminal controller 210 may use the timer module 234 to keep track of these "ON/OFF" transmitter basestation 226 duty cycles over time as a measure of communication activity.

Consequently, an inventive paging termianl 200 may be able to better manage the paging channel utilization by receiving and accepting those incoming page requests having message formats that optimally fill the available time (402 and 412). In this fashion, more paging traffic could be handled with the existing paging channel resources, as will be more fully discussed below.

Referring to FIG. 5, a common phenomena in communication systems is an interval of time where the level of communication activity peaks out. Typically, a peak-period time interval 500 is empirically predictable and consequently a reliable indicator of future levels of communication activity (i.e. high communication activity within the peak-period time interval 500 and low communication activity outside of the peak-period time interval 502). A page request 504 that arrives during the peak-period time interval 500 may have difficulty being processed by the paging terminal 200. Typically, the paging system resources are not able to efficiently handle the great number of incoming page requests. Consequently, the page request 504 may be rejected. When outside the peak-period time interval 502, a similar page request 506 may be efficiently processed by the paging terminal 200. Therefore, the paging terminal, controller 210 may use the timer module 234 to designate a peak-period time interval 500 as a measure of communication activity.

Therefore, an inventive paging terminal 200 may be able to better manage the available paging system resources (e.g., memory 224 and 232; and paging channel activity 400 and 410) by using the peak-period time interval as a performance criteria, and therefore, receiving and accepting those incoming page requests having message formats that optimally consume the available resources during the respective time intervals. In this fasion, more paging traffic may be handled with the existing system resources, as will be more fully discussed below.

Referring to FIG. 6, a flow chart of a paging terminal control sequence is shown receiving and optionally accepting an incoming page request, in accordance with an embodiment of the present invention. When the page request is detected 600, typically resulting from a caller dialing and connecting to the paging terminal 200 via the telephone company equipment 108, the paging terminal 200 may lookup in its database 602 for all the message formats (e.g., voice, numeric display, and alphanumerid display) that are mapped to the requested select call receiver, as indicated by the telephone number entered by the caller into the paging terminal 200. The entered number normally selects one preferred pager address coupled to a message format. Therefore, the paging terminal 200 subsequently verifies 604 that the requested (i.e., preferred) pager address maps to a "short" message format. In other words, the paging terminal 200 determines if the caller's preferred mode of conveying information to the select call receiver coincides with an efficient use of the paging system's resources. As discussed earlier for the exemplary paging system, a numeric display message page may be determined to be an efficient means of conveying information to the select call receiver. However, other message formats may also be determined efficient use of the paging system resources, as will be more fully discussed below.

If the requested pager address and message format is a "short" message format, the page is normally accepted and processed (604, 606, and 608). However, a requested "long" message format (i.e., determined to be an inefficient use of the available system resources) requires measuring the current level of communication activity (e.g., memory utilization, paging channel utilization, and/or detection of a peak-period time interval), and comparing the measure of communication activity to a threshold 610. The threshold level of activity may be either predetermined (e.g., 90% of memory in use, 80% of paging channel utilization, or within a peak-period time interval), or the threshold may be adaptively set by the paging terminal controller 210, as is more fully hereinafter discussed. Hence, if the measure of communication activity is determined at or below the threshold 610, the page request is accepted and processed (606 and 608).

When the measure of communication activity is determined above the threshold 610, the "long" message format is unacceptable under those conditions. Therefore, the paging terminal 200 searches for any "short" message format(s) mapped to the particular select cell receiver 612 and affirmatively prompts the caller for an alternate message format 614. The prompting may be hanjdled by the paging terminal 200 using either the synthesized voice 208, tones, or modem communication 206. A negative search 612 rejects the page 618, since the paging system is deemed too busy for the particular message format requested. In this way, the paging system throughput may be enhanced when an incoming page request may not make efficient use of the paging system's resources. Additionally, caller frustration may be reduced, since the page request may not be necessarily rejected and only the message format may be changed.

Referring to FIG. 7, a flowchart similar to FIG. 6 shows a paging terminal control sequence that uses "% channel utilization" as a measure of communication activity 702 and alternates to an available numeric display message format when the measure of communication activity is determined above a threshold (702, 704, 706, and 616), in accordance with an embodiment of the present invention. Therefore, the numeric display message format, in this exemplary system, is determined to be an efficient use of available system resources (700, 606, and 608).

Referring to FIG. 8, a flowchart illustrates a paging terminal control sequence using "% memory in use" for a measure of communication activity, in accordance with an embodiment of the present invention. In this exemplary paging system, either numeric display message pages or alphanumeric display message pages are possible. However, when the percent memory in use exceeds a threshold (e.g., 80% of page information storage memory area 232), any alphanumeric display message page may fill a maximum of one block of memory 306. Therefore, the message format must be modified to accept the "short" alphanumeric display message page.

After a page request is received and a database lookup indicates the available message formats for the select call receiver (600 and 602), similar to FIG. 6, the paging terminal accepts and processes the numeric display message page request (802, 606, and 608). Likewise, an alphanumeric display message page request with a "% memory in use" at or below the threshold is normally accepted and processed (802, 804, 606, and 608). However, a "system busy", as determined by the current "% of memory in use" being above the threshold, dictates only a "short" alphanumeric display message format is acceptable (802, 804, 806, and 608). In this way, the paging system throughput may be enhanced during the "system busy" condition. Additionally, caller frustration may be reduced, since the page request may not be necessarily rejected and only the message format may be changed.

The aforementioned method of accepting a "short" alphanumeric display message page during a "system busy" may be paralleled for a voice message paging capable system. Since the voice storage memory 224 is organized into memory blocks (302 and 304) (e.g., each possibly comprising up to four seconds of voice message), a voice message format comprising more than one memory block 302 may be determined a "long" message format and conversely a one block voice message format may be a "short" message format. Therefore, an incoming voice message page request could be constrained to a "short" voice message format during a "system busy" condition.

Referring to FIG. 9, a flowchart illustrates a paging terminal control sequence using a "peak-eriod time interval" detection for a measure of communication activity, according to an embodiment of the present invention. Further, when the measure of communication activity is determined above a threshold (i.e., within the peak-period), the "long" message format alternates to a numeric display message format, similar to FIGS. 7 and 6. In this exemplary paging terminal 200, a peak-period time interval may be designated, for example, between the hours of 9 A.M. and 5 P.M. inclusive. The paging terminal controller 210, therefore, may use the timer module 234 to indicte when an arriving page request is within the peak-period time interval 500 or outside the peak-period time interval 502.

After a page request is received and a database lookup indicates the available message formats for the select call receiver (600 and 602), similar to FIGS. 7 and 6, the paging terminal accepts and processes the numeric display message page request (902, 606, and 608). Likewise, an alphanumeric display message page request or a voice message page request that arrives outside of the peak-period time interval may be normally accepted and processed (902, 904, 606, and 608). However, when an alphanumeric display message page request or a voice message page request arrives within the peak-period time interval, only an available numeric display messatge format is acceptable (902, 904, 704, 706, and 616) for the select call receiver. If an alternate numeric display message format is not available for the select call receiver, the page is rejected, since the paging system is busy (902, 904, 704, 618, and 608). In this way, the paging system throughput may be enhanced during the peak-period time interval. Additionally, caller frustration may be reduced, since the page request may not be necessarily rejected and only the message format may be changed.

Referring to FIGS. 10A, 10B, and 10C, a flow chart is shown for a paging terminal control sequence using a more complex method of determining whether a measure of communication activity exceeds a threshold, in accordance with an embodiment of the present invention. Moreover, the threshold is adaptable by the paging terminal controller 210 according to a number of system performance criteria. The exemplary paging system normally accepts a numeric display message page request, subject to available system resources (600, 602, 902, 606,, and 608). A voice messge page request and an alphanumeric display message page request arriving outside of a peak-period time interval and having a measure of the paging system communication activity (e.g., % of memory 224 and 232 in use) below th threshold, will similarly be accepted (902, 920, 923, 930, 932, 606, and 608; and 902, 920, 922, 924, 950, 952, 606, and 608).

It may be noted that the paging terminal controller 210 adapts the thresholds, in this embodiment, to enhance the resources management process. By using the detection of an occurrence of a peak-period time interval to adjust the respective thresholds used for accepting the voice message page request and the alphanumeric display message page request, the exemplary paging terminal 200 may better optimize the mix of accepted page requests and thereby further improve the overall paging system throughput. Hence, outside the peak-period time interval the paging terminal controller 210 may use threshold 1 and 3, and within the peak-period time interval the paging terminal controller 210 may use thresholds 2 and 4, respectively. Therefore, by adjusting the maximum acceptable threshold of communication activity (e.g., as indicated by the "% of memory in use"), the paging terminal 200 may optimally adapt to the occurrence of the peak-period time interval.

When the incoming voice message page request or the incoming alphanumeric display message page request arrives, the paging terminal may constrain the voice message or the alphanumeric display message to the corresponding "short" message format. In the case of the incoming voice message page request, threshold 1 is compared outside the peak-period time interval and threshold 2 is compared within the peak-period time interval (923, 930, 932, 934, and 608; and 923, 930, 936, 934, and 608). Similarly, with the incoming alphanumeric display message page request the paging terminal controller 210 compares the "% of page information storage memory in use" 308 to either threshold 3 or threshold 4, depending on the detection of the occurrence of the peak-period time interval (924, 950, 952, 806, and 608; and 924, 950, 954, 806, and 608). It may be noted here that outside the peak-period time interval and with the measure of communication activity (i.e., "% of memory in use") exceeding the respective threshold, the paging terminal 200 accepts the "short" message format. Further, within the peak-period time interval and with the measure of communication activity being at or below the respective threshold, the paging terminal 200 also accepts the "short" message format. Therefore, an incoming voice message page request or an incoming alphanumeric display message page request, in this exemplary paging system, may have more opportunities of being accepted in either the original message format or a similar "short" message format. This may be a significant advantage in reducing caller frustrations while optimally maintaining overall paging system throughput.

Finally, for any voice message page request or alphanumeric display message page request that arrives within the peak-period time interval and with the respective measure of communication activity exceeding the corresponding threshold, the paging terminal controller 210 may attempt to prompt the caller for an alternate numeric display message format, as may be necessary due to a "system busy" condition (923, 930, 936, 704, 706, and 616; and 924, 950, 954, 704, 706, and 616). Therefore, even under heavy paging system traffic conditions, the caller may be capable of conveying a message information to the selective call receiver using the alternate (i.e., more efficient) message information format.

I claim:

1. A communication system for communicating messages received from input devices, comprising:
   means for receiving message information in a first or second format from input devices;
   control means for detecting a measure of communication activity of the system and for comparing the measure of communication activity of the system to a threshold; and
   means, coupled to the control means and the receiving means, for accepting the message information in the first format and the second format when the measure of communication activity of the system is below the threshold, and for accepting the message information in the second format and not accepting the message information in the first format when the measure of communication activity of the system is above the threshold.

2. The communication system of claim 1, wherein the means for receiving the message information format includes means for requesting the message information format.

3. The communication system of claim 2, wherein the means for requesting the message information format comprises synthesized voice prompting.

4. The communication system of claim 2, wherein the means for requesting the message information format comprises tone prompting.

5. The communication system of claim 2. wherein the means for requesting the message information format comprises modem communication.

6. The communication system of claim 1, wherein the control means includes communication channel activity detection means for detecting a measure of communication activity.

7. The communication system of claim 1, wherein the control means includes system resources usage detection means for detecting a measure of communication activity.

8. The communication system of claim 1, wherein the control means includes timer means for designating a peak-period time interval and determining that the measure of communication activity is above the threshold when within the peak-period time interval and below the threshold when outside the peak-period time interval.

9. The communication system of claim 1, wherein the control means comprises adapting the threshold as a function of the communication activity.

10. The communication system of claim 9, wherein the control means adapts the threshold as a function of communication channel activity.

11. The communication system of claim 9, wherein the control means adapts the threshold as a function of system resources usage.

12. The communication system of claim 9, wherein the control means adapts the threshold as a function of a detection of an occurence of a peak-period time interval.

13. A method in a communication system for communicating messages received from input devices, comprising the steps of:
 (a) detecting a measure of communication activity of the system;
 (b) comparing the measure of communication activity of the system to a threshold; and
 (c) accepting message information in a first formal and not accepting the message information in a second format when the measure of communication activity is below the threshold, and further accepting the message information in the second format and not accepting the message information in the first format when the measure of communication activity of the system is above the threshold.

14. The method of claim 13, wherein the detecting step comprises detecting a communication channel activity.

15. The method of claim 13, wherein the detecting step comprises detecting a system resources usage.

16. The method of claim 13, wherein the detecting step comprises detecting an occurrence of a peak-period time interval.

17. The method of claim 16, wherein the comparing step comprises determining that the measure of communication activity is above the threshold when within the peak-period time interval and below the threshold when outside the peak-period time interval.

18. The method of claim 13, wherein the accepting step comprises a step of requesting the message information in a first format when the communication activity is below the threshold and requesting the message information in a second format when the communication activity is above the threshold.

19. The method of claim 18, wherein the requesting step comprises synthesized voice prompting.

20. The method of claim 18, wherein the requesting step comprises tone prompting.

21. The method of claim 18, wherein the requesting step comprises modem communication.

22. The method of claim 13, further comprising a step prior to step (b) of adapting the threshold as a function of communication activity.

23. The method of claim 22, wherein the adapting step comprises adapting the threshold as a function of communication channel activity.

24. The method of claim 22, wherein the adapting step comprises adapting the threshold as a function of system resources usage.

25. The method of claim 22, wherein the adapting step comprises adapting the threshold as a function of a detection of an occurrence of a peak-period time interval.

26. A communication system, comprising:
 first receiving means for receiving a first message information format;
 second receiving means for receiving a second message information format;
 control means for detecting a measure of communication activity of the system and for comparing the measure of communication activity of the system to a threshold; and
 means, coupled to the control means, the first receiving means, and the second receiving means, for accepting the first message information format and the second message information format when the measure of communication activity of the system is below the threshold, and for accepting the second messsage information format and not accepting the first message information format when the measure of communication activity of the system is above the threshold.

27. The communication system of claim 26, wherein the means for receiving the first messge information format includes means for requesting the first message information format.

28. The communication system of claim 27, wherein the means for requesting the first message information format comprises synthesized voice prompting.

29. The communication system of clailm 27, wherein the means for requesting the first message information format comprises tone prompting.

30. The communication system of claim 27, wherein the means for requesting the first messgae information format comprises modem communication.

31. The communication system of claim 26, wherein the means for receiving the second message information format includes means for requesting the second message information format.

32. The communication system of claim 31, wherein the means for requesting the second message information format comprises synthesized voice prompting.

33. The communication system of claim 31, wherein the means for requesting the second message information format comprises tone prompting.

34. The communication system of claim 31, wherein the means for requesting the second message information format comprises modem communication.

35. The communication system of claim 26, wherein the control means comprises communication channel activity detection means for detecting a measure of communication activity.

36. The communication system of claim 26, wherein the control means comprises system resources usage detection means for detecting a measure of communication activity.

37. The communication system of claim 26, wherein the control means includes timer means for designating a peak-period time interval and determining that the measure of communication activity is above the threshold when within the peak-period time interval and below the threshold when outside the peak-period time interval.

38. The communication system of claim 26, wherein the control means comprises adapting the threshold as a function of communication activity.

39. The communication system of claim 38, wherein the control means adapts the threshold as a function of communication channel activity.

40. The communication system of claim 38, wherein the control means adapts the threshold as a function of system resources usage.

41. The communication system of claim 38, wherein the control means adapts the threshold as a function of a detection of an occurrence of a peak-period time interval.

42. A paging system for communicating messages received from input devices, comprising:

means for requesting and receiving a voice message format;

means for requesting and receiving a numeric display message format;

control means for detecting a measure of paging activity, the measure comprising a measure of paging channel activity, and for comparing the measure of paging activity to a threshold adaptable by the control means as a function of the paging activity; and means, coupled to the voice message format receiving means, the numeric dispaly message format receiving means, and the control means for requesting and accepting the voice message format and the numeric display message format when the measure of paging activity is below the threshold, and further for requesting and accepting the numeric display message format but not requesting and not accepting the voice messge format when the measure of paging activity is above the threshold.

43. A paging system for communicating messages received from input devices, comprising:

means for requesting and receiving an alphanumeric display message format;

means for requesting and receiving a numeric display message format;

control means for detecting a measure of paging activity, the measure comprising a measure of paging channel activity, and for comparing the measure of paging activity to a threshold adaptable by the control means as a function of the paging activity; and means, coupled ot the alphanumeric display message format receiving means, the numeric display message format receiving means, and the control means, for requesting and accepting the alphanumeric display message format and the numeric display message format when the measure of paging activity is below the threshold, and further for requesting and accepting the numeric display message format but not requesting and not accepting the alphanumeric display message format when the measure of paging activity is above the threshold.

44. A paging system for communicating messages received from input devices, comprising:

means for requesting and receiving an alphanumeric display message format of a first length or a second length, wherein the first length is greater than the second length;

control means for detecting a measure of paging activity, the measure comprising a measure of paging channel activity and for comparing the measure of paging activity to a threshold adaptable by the control means as a function of the paging activity; and means, coupled to the alphanumeric display message format receiving means and the control means, for requesting and accepting the alphanumeric display message format of the first length or the second length when the measure of paging activity is below the threshold and requesting and accepting the alphanumeric display message format of the second length and not the first length when the measure of paging activity is above the threshold.

* * * * *

UNITED STATES PATENT AND TRADEMARK OFFICE
CERTIFICATE OF CORRECTION

PATENT NO. : 5,138,311

DATED : August 11, 1992

INVENTOR(S) : Morton Weinberg

It is certified that error appears in the above-identified patent and that said Letters Patent is hereby corrected as shown below:

column 13, line 26 after "first" delete "formal" and insert therefor --format-- column 14, line 32 delete "clailm" and insert therefor --claim-- column 15, line 24, delete "dispaly" and insert therefor --display--

Signed and Sealed this

Fourteenth Day of September, 1993

*Attest:*

BRUCE LEHMAN

*Attesting Officer*     *Commissioner of Patents and Trademarks*